US005592248A

United States Patent [19]
Norton et al.

[11] Patent Number: 5,592,248
[45] Date of Patent: Jan. 7, 1997

[54] COMPUTERIZED METHOD FOR FITTING EYEGLASSES

[76] Inventors: Ross A. Norton; Leon L. Norton, both of 1620 Euclid Ave., Bristol, Va. 24201

[21] Appl. No.: 559,364

[22] Filed: Nov. 16, 1995

[51] Int. Cl.$^6$ .............................. A61B 3/00; A61B 3/04; A61B 3/10; G02C 13/00
[52] U.S. Cl. .......................... 351/246; 351/227; 351/178; 33/200
[58] Field of Search .................................... 351/200, 223, 351/227, 246, 177, 178, 42; 33/200

[56] References Cited

U.S. PATENT DOCUMENTS 4,561,739  12/1985  Okazaki ................................. 351/227

*Primary Examiner*—Huy Mai

[57] ABSTRACT

A method is provided for custom manufacturing or fitting eyeglasses wherein a digital camera is used to take a series of digital images of selected portions of a subjects head, the images then being stored in a computer electronically associated with the camera, wherein the images contain frame and lens fitting information with respect to the size and shape of the subjects head, and thereafter providing a visual image display screen functionally associated with the computer for receiving and visually displaying the images such that an eyeglass frame and lens can be structurally and dimensionally configured in accordance with the fitting information.

5 Claims, 1 Drawing Sheet

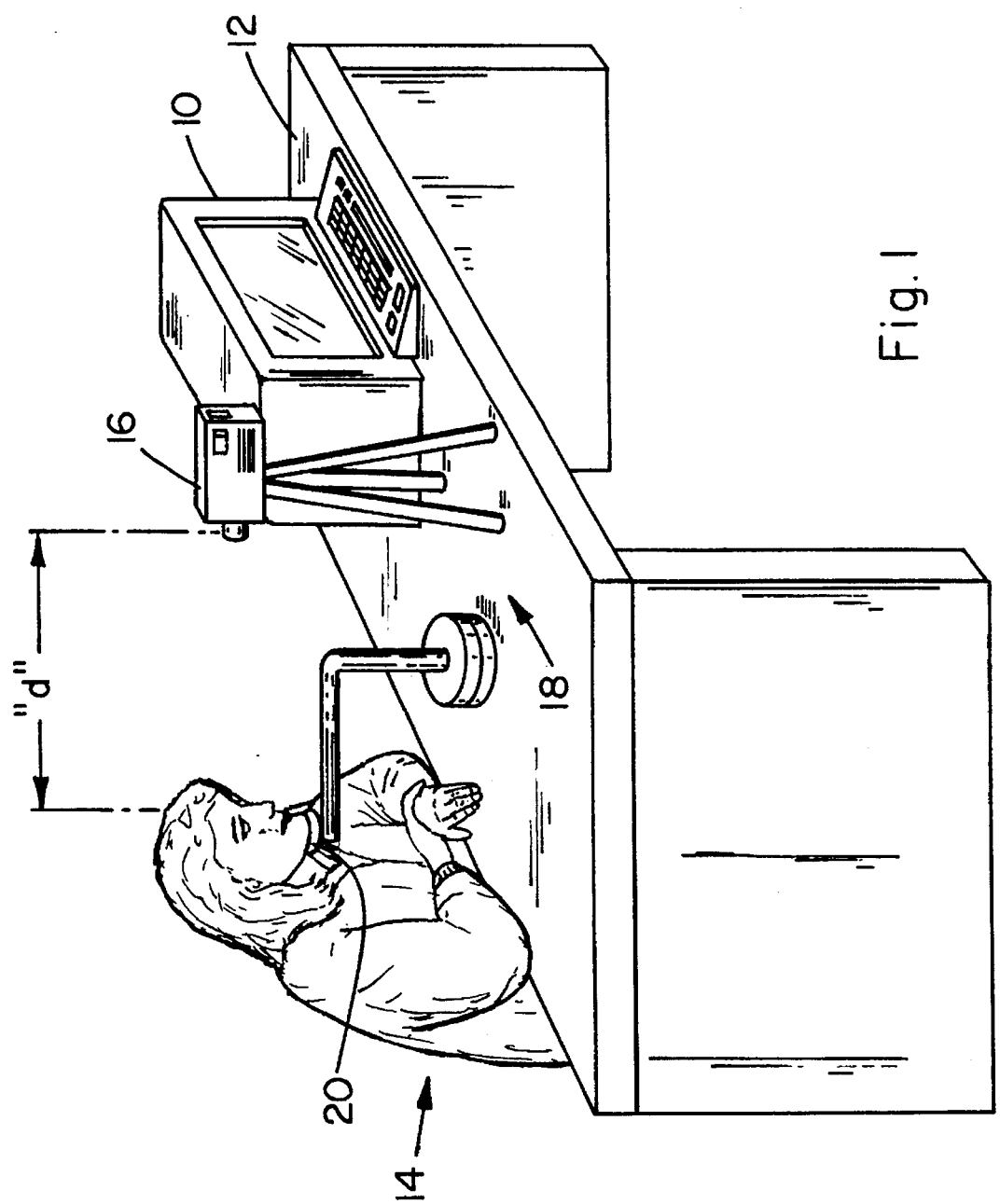

COMPUTERIZED METHOD FOR FITTING EYEGLASSES

FIELD OF THE INVENTION

This invention concerns a unique method for obtaining, storing, transmitting and using information which is designed to assist in the proper custom fitting of eyeglasses for a particular wearer.

BACKGROUND OF THE INVENTION

In the manufacture of eyeglasses a proper understanding of the spatial, angular and dimensional relationships between the lens, the frame, and the wearers head and facial portions which support the frame is necessary if the eyeglasses are to function at an optimum level. For example, where the lens is bi- or trifocal, the line or lines of demarcation between the lens sections should be positioned in the frame such that the wearer can comfortably, selectively and effectively view thru the sections without interference from the boundary lines therebetween. Further, for example, where the frame is not well fitted, within fairly close tolerances, to the bridge of the nose, the aforesaid boundary lines will interfere with vision as the frame slips or moves on the wearers nose. The ability then of the technician or optician to take the measurements which are needed for a proper understanding of the aforesaid relationships can make the difference between a good pair of eyeglasses and a non-useable pair.

The conventional methods for taking measurements for eyeglass fittings have remained virtually unchanged since the time they were deemed necessary in the alignment and fitting of the lens in the frame and of the frame to the head. Typically a hand or pocket millimeter ruler is used to take the measurements for the manufacturing and fitting processes. A visual inspection is then used with nothing more than trial and error for the fitting and adjusting of the finished product. The relatively loose tolerances for these measurements have long been set by the American National Standards Institute (ANSI) and haven't changed significantly over the years. The net results of these methods and standards are that fittings of the lens and frames are less than of maximum effectiveness, and ofttimes of even non-useable quality.

OBJECTS OF THE INVENTION

Objects, therefore, of the present invention are: to provide a method for the custom fitting of lens to frame and frame to wearer whereby greatly improved accuracy of fitting is achieved; to provide such a method which is computer aided and whereby the digital measurements can be taken by an unskilled person and then transmitted to locations remote from the wearer and stored or immediately used by a skilled lens maker or frame fitter; to provide such a method whereby manual or visual taking of measurements is obviated; to provide such a method which will create a higher level of accuracy, and a marked reduction in technical effort and time and which will effect greater customer satisfaction, convenience and comfort; and to provide such an apparatus for carrying out the present method, in a form which is convenient to use and is of minimum cost.

SUMMARY OF THE INVENTION

The above and other objects hereafter appearing have been attained in accordance with the present invention which in a broad embodiment is defined as a method for custom manufacturing or fitting eyeglasses comprising the steps of:

(a) providing digital camera means and taking a series of digital images of selected portions of a wearer's head and storing the images in computer means electronically associated therewith, said images comprising frame and lens fitting information with respect to the size and shape of the wearer's head;

(b) providing visual image display means functionally associated with said computer means for receiving and visually displaying said images;

(c) providing a display of selected ones of said images on said display means; and (d) providing eyeglass lens and frame means which are structurally and dimensionally configured and positioned with respect to each other in accordance with said fitting information.

In certain preferred embodiments:

(a) said camera means and display means are located at stations remote from each other;

(b) said head portions include the face, front and sides of the head, and said information includes dimensions and shapes of the eyes, nose, eye sockets, temples and ears; and (c) said images are converted to three dimensional image displays.

BRIEF DESCRIPTION OF THE DRAWINGS

The invention will be further understood from the following description and drawing wherein the sole FIG. 1 is a representation of a typical measurement taking session in accordance with the present invention.

DESCRIPTION OF THE PREFERRED EMBODIMENTS

Referring to the drawing and claims hereof, a desk top computer 10 is located on the fitting table 12 at which the patient or subject 14 sits on one side and the computer operator (not shown) sits facing the computer. The digital camera 16 is electronically connected to the computer and positioned on a tripod type holder 18, preferably at a fixed distance "d" from the subjects chin or other selected head portions including the facial area, and provided with vertical and horizontal adjustments. A chin rest 20 is provided that can be adjusted up and down and which can pivot to present side views of the subjects head. The height of the chin rest is matched by the camera's height and this will create the controlled distance "d" between camera and the patient, e.g., 14 inches as tested, but can be calipered at any distance with software and known measurements.

Preferably, at least three pictures will be taken, e.g., one of the patients face with the selected frame on, and one of each of the left and right side of the head. These pictures can then be sent by modem over telephone lines directly to another computer located at the opticians office wherein the lens is manufactured to optical specifications and to dimensional specifications dictated by the aforesaid spatial, angular and dimensional relationships established by the camera recorded measurements. It is noted that any number of pictures can be taken with and without the frame and lens in place on the wearer's head, and at any desired angles, whereby the overall accuracy of measurement and fitting will be improved. Also, any number of cameras can be used, for example, for 3-D representations, whereby, e.g., side views can be taken without the need for sidewise pivoting of the head. Also, the information can be transmitted automatically to a facsimile terminal for showing the measurements and/or the facial features.

This method in which a computer along with a digital camera is used and can achieve much more accurate and needed measurements for a more precise fitting and manufacture of corrective eyeware. The tolerances can be cut to 100th of a millimeter rather than the 2 or 3 mm which is allowable under the aforesaid ANSI standards and which can cause varied vision in some situations. With the present method a very precise fit can be obtained and a pre-adjusted pair of completed eyeglasses can be put on and fit very accurately the first time. The manufacturer can actually see the image of the wearer right in his laboratory, something unavailable until now.

The equipment employed in testing the above method comprised:

(1) Apple Macintosh Performa 575 with 14 Sony Trinitron Monitor with 8 megabytes of Random Access Memory;

(2) Apple Quick Tak 150 digital color camera;

(3) Publish-It software for measuring and scaling of digital picture. (Any software with on screen movable rulers will);

(4) U.S. Robotics Mac & Fax 14,000 bps U.32 modem; and

A 3-D camera and viewing screen such as marketed by Fuji Corporation may be used.

When the images are received at the opticians office they are viewed with a scaling and measuring capable program, such as "Publish-it" which was used in our testing. The program allows a metric ruler displayed on the viewing screen to be moved by a manually operated controller to any position with respect to the head portions being displayed also on the screen such that the various distances between any two points on said portions can be readily visually read from the ruler in a highly accurate manner.

The images at 14 inches were enlarged by exactly 212% to gain the correct image ratio for concise measuring. The computer shows the resized color picture on the computer monitor whereon screen movable rulers measure the features on the picture with great accuracy. The accuracy is far better than that of the conventional eyeball technique employing a mm ruler, which is the presently accepted method. Two of the principal measurements required to be taken in making a pair of eyeglasses are the distance between the two pupils and the height at which the optical center or multifocal portion should be positioned relevant to the frame being used. The present test measurements were accurate to within about 100th of a mm, vs. conventional tolerances of up to two or more whole millimeters.

Other measurements are preferably taken from these same pictures but are not legally necessary for the manufacture of a pair of eyeglasses. Such additional measurements are very beneficial for the comfort of the wearer and proper positioning on a patients face and may include the length of the temple and the amount of curve that should be applied to fit comfortably around the patients ear. The angle of the plane of the front of the eyeglasses in respect to the front of the face, referred to panascopic of retroscopic angle, can also be measured. As a matter of fact any facial or frame feature can be measured very accurately by the present method and can be transmitted in two or three dimensional images to the individual or laboratory concerned.

The aforesaid principal measurements until now were crudely measured by a hand mm ruler or more commonly derived by the fitter merely by judging their correct positioning with a visual observation only, without any type of measuring device at all. With the present computer method, angles and distances can be measured with great accuracy for a much better fit. These measurements can be taken and the eyeglasses made at a totally different location than where the patient bought them. They can be made immediately at that location and express mailed directly to the patient already pre-adjusted, something impossible in the past.

The present procedure will create a video library of scaled facial pictures that can be recalled at anytime for reference. These pictures can even be printed out in life size color to scale if needed. This in itself is a great break-through but adding the ability to take these images and get meticulously detailed measurements from them is even better. Another advantage is that the optical professional doing the measurements doesn't have to be at the same location as the patient to obtain the necessary measurements. These images are used in making and adjusting the patients eyeware with great accuracy and can be checked and rechecked just by looking at the computer picture. An aspect of human error is also eliminated where today numbers are typically transferred several times by human voice and transcribed by human hands creating a good possibility of human mistake. Now the actual wearer's image will be used by the manufacturing personnel to get a much more concise product, removing any doubt of what is needed by way of measurements in the manufacturing and fitting of corrective eyeglasses. The convenience factor for the patient has never been at such a level until now either. Until now a pair of eyeglasses couldn't be mailed to the wearer with a high degree of certainty of its fit. Now it can and a patient doesn't have to come back to the office to pick up his glasses.

The invention has been described in detail with particular reference to preferred embodiments thereof, but it will be understood that variations and modifications will be effected with the spirit and scope of the invention.

I claim:

1. The method for custom manufacturing or fitting eyeglasses comprising the steps of:

(a) providing digital camera means and taking a series of digital electronic images of selected portions of a subjects head;

(b) digitally transmitting said images to primary computer means electronically associated therewith, said images comprising frame and lens fitting information with respect to the size and shape of the subjects head;

(c) providing visual image display means functionally associated with said computer means for receiving therefrom and visually displaying said images;

(d) providing a display of selected ones of said images on said display means; and (e) providing eyeglass frame means and lens which are structurally and dimensionally configured in accordance with said fitting information.

2. The method of claim 1 wherein said camera means and display means are located at stations remote from each other and said computer means is adapted to transmit said images to secondary computer means.

3. The method of claim 1 wherein said head portions include the face, front, and sides of the head, and said information includes dimensions and shapes of the eyes, nose, eye sockets, temples and ears.

4. The method of claim 1 wherein said images are taken as a three dimensional array, and wherein said display means is adapted to provide three dimensional images to an observer.

5. The method of claim 1 wherein said digital camera means is set up in a mobile unit whereby the images of many employees or other persons at different locations can be made by the same digital camera means set-up and the same technician.

* * * * *